INVENTOR.
HAL B. H. COOPER

United States Patent Office 3,734,842
Patented May 22, 1973

3,734,842
ELECTROLYTIC PROCESS FOR THE PRODUCTION OF ALKALI METAL BOROHYDRIDES
Hal B. H. Cooper, 4234 Chevy Chase Drive, Pasadena, Calif. 91103
Continuation-in-part of abandoned application Ser. No. 881,664, Dec. 3, 1969. This application May 5, 1971, Ser. No. 140,584
Int. Cl. B01k 1/00; C01b 6/14
U.S. Cl. 204—86                                21 Claims

ABSTRACT OF THE DISCLOSURE

A process for producing an alkali-metal borohydride solution utilizing an electrolytic cell having a cationic-selective membrane separating the anode and cathode compartments with reduction of borate ions to borohydride ions occurring in the cathode compartment to produce the alkali-metal borohydride solution from which the borohydride material may be separated.

---

Figure 1:
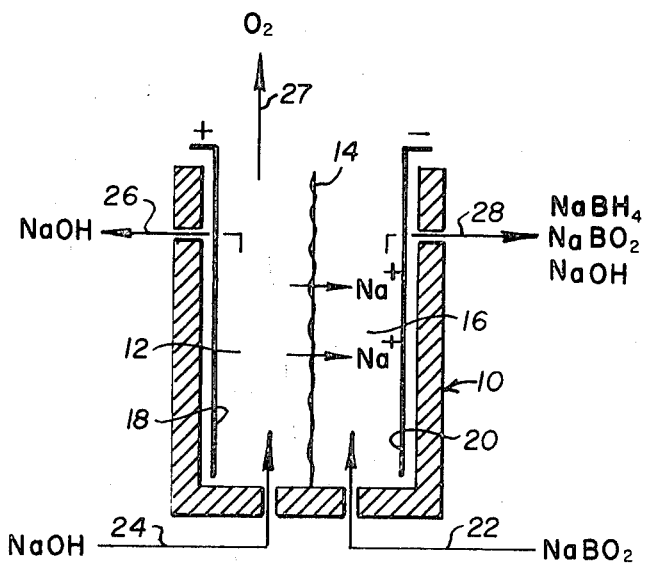

This application is a continuation-in-part of application Ser. No. 881,664, filed Dec. 3, 1969, now abandoned.

BACKGROUND OF THE INVENTION

(1) Field of the invention

This invention relates to a novel and improved method for the preparation of alkali metal borohydrides and alkali metal borohydride-containing solutions.

The alkali metal borohydrides are unique materials in their ability to carry large amounts of hydrogen in a safe and innocuous form. Sodium borohydride is an exceptionally effective bleaching agent and pulp brightness stabilizer through its powerful reducing effect on carbonyl groups contained in cellulosic products. It is highly effective for the removal of dyes and inks from reclaimed paper or textiles. The material is particularly attractive as a selective reducing agent for various organic materials. For example, it offers great promise as the reducing agent in vat dying operations. It may be employed for the stereospecific hydrogenation of ketosteroids and streptomycin and employed in the reduction reaction of various aromatic nitrogen compounds. It can serve as an excellent antioxidant or reducing agent, and can replace practically all uses of the hydrosulfites against which it can offer a major economic advantage. In addition, sodium and lithium borohydrides can be used for the generation of high purity hydrogen through reaction with water. The latter characteristic of sodium borohydride permits it to serve in the foaming of rubber and various plastics. The borohydrides offer great potential as a fuel in fuel cell systems. For example, sodium borohydride in an aqueous solution offers an available hydrogen content of 21 percent hydrogen and lithium borohydride close to 37 percent.

(2) Description of the prior art

The alkali metal borohydrides and, in particular, sodium borohydride, have not achieved their indicated widespread usage simply because of their high cost. The selling price of sodium borohydride produced in accordance with conventional industrial processes is necessarily pegged to the cost of metallic sodium. The commercial routes now employed for the production of sodium borohydride each require four moles of sodium for each mole of sodium borohydride produced. Consequently, a decisive consideration in establishing long term cost of sodium borohydride is the cost of the metallic sodium used in its manufacture. The several industrial processes presently employed for the production of sodium borohydride are described, along with a discussion of the economics involved, in an article entitled "Na Borohydride: Can Cost be Lowered?," Canadian Chemical Processing, 47, No. 12, 57–59 and 62 (1963). The processes described in the foregoing literature article all require four moles of alkali metal (or alkali metal hydride) for each mole of alkali metal borohydride produced. In these prior art processes, alkali metal or alkali metal hydride is used as a reducing agent to convert boron-oxygen bonds to boron-hydrogen bonds. Thus, for three of the hydrogen-boron bonds of the alkali metal borohydride, three moles of alkali metal have to be employed to remove the oxygen of the boron-oxygen starting composition.

A significant advancement over the foregoing processes is described in U.S. Patent No. 3,473,899, Cooper, issued Oct. 21, 1969, entitled Production of Alkali Metal Borohydrides. The process of Patent No. 3,473,899 utilizes only one mole of sodium or other alkali metal for each mole of the alkali metal borohydride, produced, because inexpensive carbon is used as the reducing agent instead of the high cost alkali metal. In a preferred embodiment of the process of Patent No. 3,473,899 an alkali metal boron oxide such as borax is reduced to provide the alkali metal and a reduced boron material. The alkali metal, sodium in the instance of borax, is converted to the hydride and the reduced boron to diborane. The sodium hydride and the diborane are then reacted to form the alkali metal borohydride. In the instance where borax is utilized as a starting material one-half of the sodium is supplied by the boron source. When the starting material is an alkali metal borate, such as sodium metaborate, where the sodium and boron are present in a 1:1 molar ratio, all of the sodium is provided with the boron feed material. Several valuable intermediates including reduced boron materials, boron trihalide, dihaloborane, and diborane are available from the process of the Cooper patent. While the process of Patent No. 3,473,899 represents a distinct advancement over the industrial processes heretofore employed, a significant capital investment in the plant for its manufacture is required.

(3) Summary of the invention

It is an object of this invention to provide an improved and lower cost method for the production of alkali metal borohydrides which is independent of the cost of metallic sodium.

A further object is to provide a process having a reduced capital investment.

In the process of the invention for the production of an alkali borohydride-containing solution, there is provided an electrolytic cell having an anode compartment containing an anodic surface separated by a cationic-selective ion-exchange membrane from a cathode compartment containing a cathodic surface. The ion-exchange membrane is pervious to the passage of cations and relatively impervious to the passage of anions. A catholyte containing borate ions is supplied in the cathode compartment and an electrolyte, preferably containing alkali metal cations, is provided in the anode compartment. The process may be operated in a batch-wise or in a continuous manner. A direct current flows across the membrane and promotes within the cathode compartment reduction of the borate anions to borohydride ions. The cationic-selective ion-exchange membrane does not allow the negatively charged borate or borohydride ions to transfer to the anode. In a preferred embodiment, the process is operated to provide alkaline conditions in the cathode compartment, thus stabilizing the alkali metal borohydride product and minimizing its hydrolysis to the corresponding alkali metal borate and hydrogen. Furthermore, the solubility of the alkali metal borohydride is reduced in alkaline solutions, thereby making its recovery easier by crystallization. The reducing power of the catholyte is significant and in some applications, the catholyte solution may be utilized for its reducing capacity without the need to separate the alkali metal borohydride.

In a favored embodiment of the process of the invention, the borate ion of the catholyte is provided by an aqueous solution of sodium metaborate, and the alkali metal cations of the anolyte are furnished by an aqueous solution of sodium hydroxide. In the foregoing process, the reactions taking place within the cathode and anode compartments are indicated respectively by Equations 1 and 2 below, with the overall cell reaction being that of Equation 3.

Cathode reaction:

(1) $NaBO_2 + 8Na^+ + 6H_2O + 8e^- \rightarrow NaBH_4 + 8NaOH$

Anode reaction:

(2) $8NaOH \rightarrow 2O_2 + 4H_2O + 8Na^+ + 8e^-$ (a) $8NaOH \rightarrow 8Na^+ + 8OH^-$ (b) $8OH^- \rightarrow 2O_2 + 4H_2O + 8e^-$ Overall cell reaction:

(3) $$NaBO_2 + 2H_2O \xrightarrow[NaOH]{8\ Faradays} NaBH_4 + 2O_2$$

The foregoing example of the electrolysis of sodium metaborate is exemplary, which process is illustrated in FIG. 1 of the drawing, and is not intended to be limiting.

Figure 2:
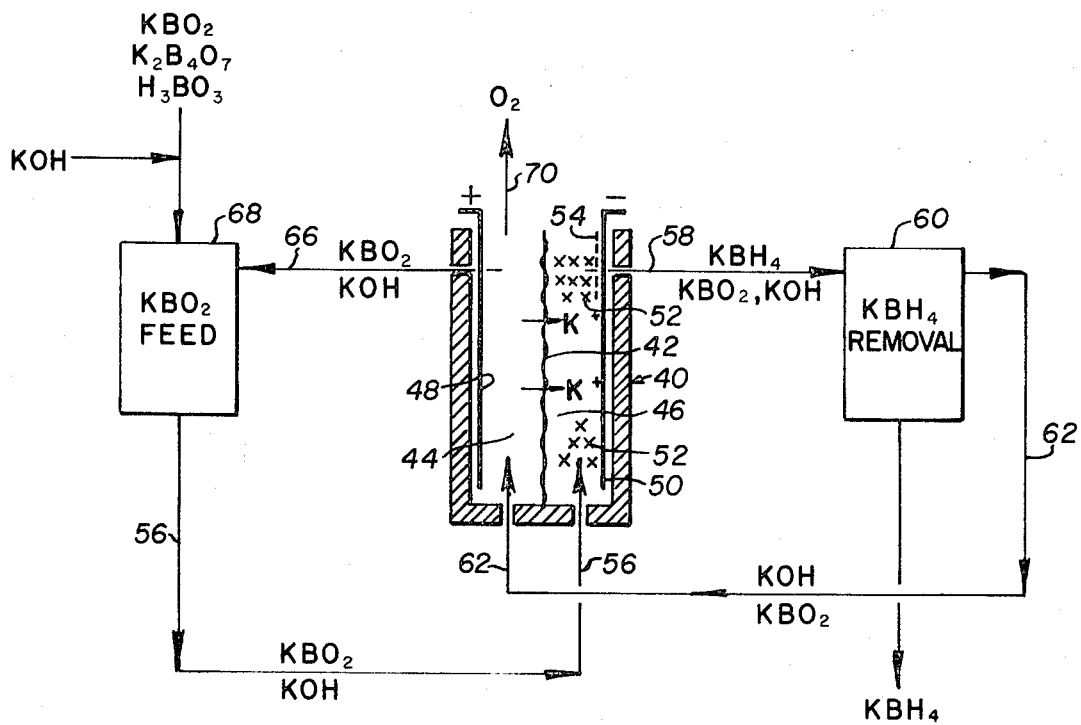

FIG. 2 of the drawings is a preferred manner of operating the process of the invention, illustrated for the production of potassium borohydride, wherein there is a closed cycle for the potassium ions which serve in the dual role of providing current transfer across the cationic ion-selective membrane and for maintenance of alkaline conditions in the catholyte.

Electrolytic cell 10 of FIG. 1 comprises an anode compartment 12 separated by a cationic-selective ion-exchange membrane 14, from a cathode compartment 16. The anode compartment 12 and cathode compartment 16 are provided, respectively, with an anodic surface 18 and cathodic surface 20. The cathodic surface may be formed of a hydrogenation catalytic material.

An aqueous solution of sodium metaborate is introduced through a line 22 to the cathode compartment 16 of the cell 10. An electrolyte solution or anolyte comprising an aqueous caustic solution is introduced to the anode compartment 12 through a line 24. The anolyte and catholyte are, respectively, removed from the electrolytic cell 10 through lines 26 and 28. Oxygen generated at the anode is vented from the upper region of the anode compartment.

The reaction occurring at the cathode is represented in Equation 1, in which one mole of sodium metaborate $NaBO_2$ reacts with 8 equivalents of sodium ions and 6 moles of water to give one mole of sodium borohydride and 8 moles of sodium hydroxide. More specifically, it is seen that the electropositive sodium ions are attracted through the membrane 14 to the cathode 20 where they gain their respective electrons, discharging elemental sodium which active sodium reacts with water to provide nascent hydrogen for the reduction of the metaborate ion to the borohydride ion, and also returning the sodium to its ion form to produce sodium hydroxide. It will be noted that there are 8 moles of sodium hydroxide formed for each mole of sodium borohydride produced in the cathode compartment.

The negatively charged borohydride ions formed at the cathode are trapped in the catholyte since the cationic-selective ion-exchange membrane prevents their migration to the anode where they would otherwise be oxidized and thus lost. The alkali metal borohydride produced is then removed from the electrolytic cell in the catholyte product stream for recovery or direct use.

The principal reaction occurring in the anode compartment is illustrated in Equation 2 where the caustic soda, sodium hydroxide, solution dissociates to sodium $Na^+$ and hydroxyl $OH^-$ ions. The positively charged sodium cations are attracted to the cathode 20, passing through the cationic selective membrane 14 and the negatively charged hydroxyl ions are discharged at the anode 18 to produce oxygen and water.

The overall reaction is represented by Equation 3 where it is seen 8 Faradays of electricity are theoretically required to produce one mole of sodium borohydride.

The electrodes, i.e., the anodic and cathodic surfaces, are formed of electrically-conductive materials, for example, graphite, carbon, nickel, cobalt, silver, stainless steel, iron, nickel-plated iron, platinized titanium or tantalum, platinum, palladium, iridium, and many other metals or composite structural materials. It is generally advantageous to activate the reaction between the borate ion and the nascent hydrogen generated at the cathodic surface. Among the hydrogenation catalytic materials of which the cathode may be formed or which, alternately, may be furnished in the cathode compartment apart from the cathode per se, are nickel boride, nickel, Raney nickel, cobalt, cobalt boride, platinum, and palladium, mixtures thereof, and other environmental-stable hydrogenation catalysts.

The cathode may be a solid sheet, in which case the catholyte is provided to the cell in the cathode region such that it is in intimate contact with the electrode surface or the nascent hydrogen formed at the cathode during passage of electric current through the cell. In still another form of the cathode, and in order to provide a large reactive surface, the cathode (preferably made of finely divided and catalytic material) is porous and in the form of a sheet, in which instance the catholyte is introduced to the cell and cathode compartment through the porous sheet. In this case, the catholyte passes through the pores of the cathode into the cathode compartment. The reaction is thought to occur principally at the interface of the pores where there is contact between the borate ions of the catholyte, and the active elemental sodium just discharged, the nascent hydrogen and the catalytic cathodic surfaces. This reactive surface for the reduction of the borate ion may also be increased by operating with one or more of the earlier-listed reduction catalysts immersed in the catholyte in the vicinity of the cathode. Finely divided metal particles may also be employed for the reduction, for example, nickel powder in the 50 to 200 mesh range. It is also known that the electrode surface may be increased by using electrodes provided with vertical grooves along the outer surface of either straight or sinuous contour, or of wire mesh or felt. The anode, similarly, may be either a solid sheet or of similar construction to that described for the cathode in the various alternate forms discussed above.

In one form of the electrolytic cell of the invention, as shown schematically in the drawing, the catholyte and, similarly, the anolyte are introduced to their respective compartments at the base thereof, and permitted to flow upwardly along the length of the electrode, being removed, respectively, from the cell at upper levels thereof.

The cationic selective ion-exchange membrane is formed of a cationic ion-exchange resin prepared in a thin sheet. The membrane is substantially impervious to water, the electrolytes, and to ions carrying a negative charge, but permeable to ions having a positive charge. The membrane desirably has as high a cation transport number as possible and is desirably low in permeability to anions. Suitable cation exchange materials are well known in the art. Typically, the type of cationic exchange membrane ordinarily affording a high permselectivity towards cations is that in which the carboxylic acid groups are fixed into a polymeric matrix. U.S. Pat. 2,731,408 discloses a method for preparing a suitable membrane. Similarly, resins may be employed based on sulfonic acid groups. The resinous cationic exchange material is typically incorporated into a sheet-like reinforcing matrix in order to increase the mechanical strength and heat resistance of the membrane. Suitable reinforcing materials include woven or felted materials, such as glass filter cloth, polyvinylidene chloride, polypropylene, cellulose paper, asbestos, and similar porous materials of adequate strength.

In the process illustrated in the flow diagram of FIG. 1 of the drawing, the entering catholyte stream contains sodium borate. The sodium hydroxide produced in the cathode compartment converts the sodium borate to sodium metaborate. Caustic present in the catholyte provides alkaline conditions for stabilizing the alkaline metal borohydride and minimizes its hydrolysis and loss in accordance with Equation 4 below:

(4)  $NaBH_4 + 2H_2O \rightarrow NaBO_2 + 2H_2$

The alkalinity of the catholyte is desirably maintained as in the process of FIG. 2 by providing alkali metal ions in the anolyte which ions serve to carry the current across the membrane 42 and are then present in the catholyte to form alkali metal hydroxide.

It should be understood that the cell may be operated with the entering catholyte feed having a pH somewhat on the acid side, since the alkali metal ions transferring to the catholyte rapidly convert such a catholyte to an alkaline condition. Where the pH is not high, it is important in such an operation for the alkali metal borohydride to be rapidly recovered from the catholyte solution and dried to minimize loss due to hydrolysis. Generally, it is more desirable to provide some alkali metal hydroxide in the entering feed to the cathode compartment to maintain an initial alkaline condition.

The alkali metal borohydride-containing catholyte from the cell may be used without separation of the borohydride in certain applications, for example, in the reductive bleaching of paper pulp and for the reducing of various organic compounds. The catholyte product could be used for the operation of a fuel cell employing the alkali metal borohydride as the fuel source. The catholyte solution is also suitable for the removal of dyes and inks from reclaimed paper or textiles. Where the alkali metal borohydride is desired in a more concentrated form, it will, of course, be necessary to recover it from the catholyte solution.

The concentration of the borate, for example, the alkali metal metaborate, borax, or boric acid in the catholyte, may vary over a relatively wide range such as from dilute to saturated solutions. However, to assure adequate conductivity, it is preferred to employ a solution having at least 0.1 percent by weight, preferably above 1.0 percent, and usually in excess of 5 percent, of the electrolyte dissolved therein. The desired upper concentration will be determined by the solubility of the particular electrolyte under the selected conditions of pressure and temperature at which the cell operates. The concentration of the electrolyte whether it be in the anolyte or catholyte is selected to avoid precipitation of solids within the cell. The temperature of operation of the cell will, of course, have a bearing on the optimum concentration of the electrolyte. Another important consideration in the selection of the concentration of the electrolyte is that it be of a magnitude that will facilitate recovery in the instance of the catholyte, of the alkali metal borohydride product. The solubility of the various alkali metal borohydrides varies radically, for example, at 25° C. potassium borohydride has a solubility of 19 g./100 g. water, and, in contrast, sodium borohydride has a solubility of 55 g./100 g. water.

The temperature for the operation of the cell, that is the temperature of the anolyte and catholyte, is not critical and may vary considerably depending, among other things, upon the particular material being processed, solubilities and pressures. Preferably, the process of the invention is operated with the temperatures of anolyte and catholyte within the range of about 25° C. to 80° C. The process of the invention with substantially atmospheric pressure prevailing, may be operated within the broader range of 0 to 100° C. Pressure operations permits utilization of higher temperatures with the upper limit depending, inter alia, upon such factors as the stability of the cationic selective membrane and the tendency of the alkali metal borohydride product to decompose at higher temperatures. The latter temperature effect, i.e. decomposition, may be largely offset by suitable alkalinity of the catholyte solution.

The electrochemical cell may be operated over a wide range of cathodic current densities, such as between about 0.1 and about 6.0 amperes per square inch of apparent electrode surface, and more usually, at a current density of about 0.4 to about 1.0 ampere per square inch. The operating voltage of the cell is in excess of that voltage required to obtain electrolysis of water, i.e., at least 1.23 volts. Typical operations lie between 4 and 12 volts, although higher voltages can be employed, usually, however, with a loss in efficiency.

In the practical operation of the process, only a portion of the alkali metal metaborate is converted to the borohydride in the cell. As the conversion to borohydride is increased, the current efficiency tends to fall off as the concentration of sodium metaborate in the catholyte decreases. Under these latter conditions more hydrogen gas is liberated. The recovery of the alkali metal borohydride is generally made easier, with higher concentrations, however, this advantage must be balanced against the lower current efficiency. The current efficiency varies considerably depending upon the electrode design employed and the current densities and voltages. Generally, conversions to sodium or potassium borohydride in the range of 20 to 80 percent are employed, although the cell may be operated both above and below this range.

A preferred manner of operating the electrochemical cell in the practice of the process of the invention is illustrated in the flow diagram of FIG. 2. The process illustrated in FIG. 2 applies to the production of potassium borohydride but it will be understood that the principles of the system are applicable to the manufacture of other alkali metal borohydrides (sodium, lithium, rubidium, and cesium).

With reference to Equation 1 preceding, it will be seen that in the production of one mole of the alkali metal borohydride there are eight moles of the alkali metal hydroxide formed in the catholyte. The alkali metal cations needed for the formation of the hydroxide is provided, as shown in Equation 2, from the alkali metal hydroxide of the anolyte. Upon application of the electrical potential across the electrodes of the cell, there is a passage of the alkali metal ions from the anode compartment to the cathode compartment through the cationic selective membrane. Thus, it is seen that the anolyte becomes deficient in alkali metal hydroxide to the extent that alkali metal hydroxide is generated in the cathode compartment. The process illustrated in the flow diagram of FIG. 2 provides a closed loop for the alkali metal ion, permitting its transfer from the anode compartment to the cathode compartment and return to the anode compartment, with a resulting favorable economics of operation.

The electrochemical cell 40 of FIG. 2 is divided by a cationic selective membrane 42 into an anode compartment 44 and cathode compartment 46 with the respective compartments having electrode surfaces 48 and 50. The cathode compartment 46 is packed with catalyst 52 which may be in form of powder or granules, which are confined within the cathode compartment by means of a porous diaphragm 54, or other fluid permeable material, such as a fine-mesh screen which is illustrated as positioned across the upper outlet of the cathode compartment. A similar screen may be positioned across the inlet, if necessary. The catalyst may be self-contained within the compartment, such as within a screen framework, or within a woven, flexible fabric formed of, for example, asbestos, polypropylene, polyethylene, polytetrafluoroethylene and the like. The catalyst which is immersed in the catholyte may be one of various known hydrogenation catalysts enumerated above, for example, nickel boride, nickel, platinum, palladium, etc. and may or may not be the same as the material of which the cathode is formed or which is incorporated into the cathode. The particles 52 of catalyst provide a large reactive surface for the reaction between the alkali metal metaborate and the nascent sodium and nascent hydrogen generated at the cathode.

With reference to FIG. 2 the aqueous solution provided to the cathode compartment 46 by line 56 contains potassium metaborate and potassium hydroxide. Potassium borohydride is formed in accordance with Equation 1, along with eight moles of potassium hydroxide for each mole of the borohydride product. From the cathode compartment the aqueous solution is transferred by conduit 58 to a potassium borohydride recovery zone 60. The aqueous solution of conduit 58 contains potassium hydroxide, unconverted potassium metaborate and potassium borohydride. Because of its considerably less solubility in water than potassium metaborate and potassium hydroxide, the potassium borohydride product may be separated by a crystallization step 60 through a lowering of the temperature of the aqueous solution or, alternatively, by adding a further quantity of potassium hydroxide, or both.

From the crystallization zone 60 the aqueous media containing principally potassium hydroxide and potassium metaborate, following removal of the potassium borohydride product, is returned in line 62 to the electrochemical cell 40 as the anolyte of the anode compartment 44. The aqueous slution of the return line 62 has a high concentration of the potassium hydroxide which was built up in its passage through the cathode zone 46. The aqueous solution in its passage through the anode compartment 44 provides the potassium ions which serve as the current carrier between the anode and the cathode electrodes. The cationic selective membrane 42 permits passage of the potassium ions but prevents the reverse migration of the negative borate $BO_2^-$ ions, and the borohydride $BH_4^-$ ions from the cathode compartment 46 to the anode compartment 44. Without the cationic ion exchange membrane 42 there would be migration of the foregoing anions to the anode and consequently no production of the alkali metal borohydride within the cathode compartment.

The anolyte now of reduced potassium hydroxide concentration and containing potassium metaborate is removed from the cell 40 and the anode compartment 44 in a line 66 and transferred to a potassium metaborate make-up tank 68. Oxygen generated in the anode compartment in accordance with Equation 2 is vented from the anode compartment, being removed in a vapor line 70.

Within the potassium borate make-up tank 68 the concentration of the potassium metaborate is built up to the desired operating level for recycle. Various sources of boron compounds may be provided to the feed tank 68 including boric acid, potassium tetraborate, and potassium metaborate. Where the boron source takes the form of either boric acid or the tetraborate, it may be necessary to supply potassium hydroxide.

Various sources of the alkali metal ions may be provided in the anolyte including the chloride salts, e.g. sodium chloride, potassium chloride, and ltihium chloride in the manufacture of their corresponding alkali metal borohydrides. Where the source of the alkali metal ion is a chloride salt supplied in an aqueous solution, for example, to the anode compartment 12 of cell 10 of FIG. 1, chlorine will be removed as a byproduct rather than oxygen from the cell 10. Sodium chloride in aqueous solution is a particularly economical source of sodium ions. Other desirable sources of alkali metal ions are the alkali metal carbonates, e.g. sodium carbonate, potassium carbonate, and sulfates, e.g. sodium sulfate, potassium sulfate. On electrolysis, the carbonates of the anolyte liberate oxygen and provide alkali metal acid carbonates in the exiting stream from the anode compartment. Similarly, the alkali metal sulfates liberate oxygen and transform to their corresponding alkali metal acid sulfates.

In one version of the process of the invention, mercury may be employed as a cathode of the electrolytic cell. The sodium ion being discharged at the cathode forms an amalgam of mercury and sodium. The metallic sodium of the amalgam reacts with water and sodium borate to produce nascent hydrogen, caustic and sodium borohydride.

Alternatively, and in a manner similar to that practiced in the operation of a chlorine-caustic cell, the amalgam is removed from the electrolytic cell and thereafter introduced to a reaction zone where it is then exposed to the aqueous solution of sodium borate. As before, the metallic sodium of the amalgam reacts with the water and sodium borate to produce nascent hydrogen caustic and sodium borohydride. Alternatively, in the latter approach, the sodium borate solution is introduced in sequence to the electrolytic cell and the separate reaction zone; that is to say, both the sodium borate solution and the mercury amalgam are removed from the electrolytic cell and passed to the sequentially-located zone where the reaction is completed.

Having thus described this invention fully and completely as required by the patent laws, it will be apparent to those skilled in the art that other variations are possible. The preactive of the invention is to be limited only by the scope of the following claim.

I claim:

1. In a process for the production of an alkali-metal borohydride solution employing an electrolytic cell having an anode and cathode, the improvements comprising:
providing an alkaline solution of borate ions in the vicinity of the cathode;
causing current flow between the anode and the cathode;
preventing the migration of the borate ions to the anode;
promoting in the vicinity of the cathode reduction of the borate ions to borohydride ions; and
forestalling migration of the latter ions to the anode.

2. In a process for the production of an alkali-metal borohydride-containing solution, the steps comprising:
providing an electrolytic cell having a cathode compartment separated from an anode compartment by a cationic-selective ion-exchange membrane pervious to the passage of cations and relatively impervious to the passage of anions;
providing an electrolyte in the anode compartment and a catholyte in the cathode compartment, said catholyte comprising a solution containing borate ions;
causing current flow across the membrane; and
promoting within the cathode compartment reduction of the borate ions to borohydride ions.

3. A process in accordance with claim 2 wherein alkaline conditions are maintained within the catholyte to minimize hydrolysis of the borohydride ion to borate ions.

4. A process in accordance with claim 2 wherein the catholyte comprises an aqueous solution of an akali metal metaborate and an alkali metal hydroxide.

5. A process in accordance with claim 2 wherein a hydrogenation catalyst is provided in the cathode compartment.

6. A process in accordance with claim 2 wherein the catholyte is prepared from an aqueous solution of an alkali metal tetraborate and an alkali metal hydroxide.

7. A process in accordance with claim 2 wherein the electrolyte in the anode compartment comprises an aqueous solution containing alkali metal ions.

8. A process for the production of an alkali metal borohydride-containing solution, said process comprising:
providing an electrolytic cell having an anode compartment containing an anodic surface separated by a cationic-selective ion-exchange membrane from a cathode compartment containing a cathodic surface, said membrane being pervious to the passage of cations and relatively impervious to the passage of anions;

supplying an aqueous catholyte containing metaborate ions in the cathode compartment and an aqueous anolyte containing alkali metal ions in the anode compartment; and passing a direct current transversely through said compartments and ion-exchange membrane to cause migration of alkali metal ions from the anode compartment into the cathode compartment and promoting reduction of metaborate ions to borohydride ions producing an alkaline-stabilized alkali metal borohydride-containing solution in the cathode compartment.

9. A process in accordance with claim 8 wherein the catholyte supplied to the cathode compartment comprises an alkali metal metaborate solution.

10. A process in accordance with claim 9 wherein the alkali metal metaborate comprises sodium metaborate.

11. A process in accordance with claim 9 wherein the alkali metal metaborate is potassium metaborate.

12. A process in accordance with claim 9 wherein the alkali metal metaborate is lithium metaborate.

13. A process in accordance with claim 8 wherein a hydrogenation catalyst is provided in the cathode compartment.

14. A process in accordance with claim 8 wherein the catholyte comprises an aqueous solution of borax and sodium hydroxide.

15. A process in accordance wtih claim 8 wherein the anolyte comprises an aqueous solution of an alkali metal metaborate and an alkali metal hydroxide.

16. A process in accordance with claim 8 wherein the alkali metal ions of the anolyte are supplied by alkali metal hydroxide.

17. A process in accordance with claim 8 wherein the alkali metal cations of the anode compartment are supplied by an alkali metal chloride and upon electrolysis chlorine is liberated at the anodic surface.

18. A process in accordance with claim 17 wherein the alkali metal chloride is sodium chloride.

19. A process in accordance with claim 8 wherein the alkali metal cations of the anode compartment are supplied by an alkali metal sulfate.

20. A process in accordance with claim 8 wherein the alkali metal cations of the anode compartment are supplied by an alkali metal carbonate.

21. A process for the production of an alkali metal borohydride, the steps comprising:

(1) providing an electrolytic cell having an anode compartment containing an anodic surface separated by a cationic-selective ion-exchange membrane from a cathode compartment containing a cathodic surface, and a hydrogenation catalyst, said membrane being pervious to the passage of cations and relatively impervious to the passage of anions;

(2) supplying alkali metal hydroxide aqueous solutions containing borate ions as catholyte and anolyte solutions to the cathode compartment and anode compartment, respectively;

(3) passing a direct current transversely through said compartments and ion-exchange membrane to cause migration of alkali metal ions from the anode compartment into the cathode compartment there reducing borate ions to borohydride ions and producing alkali metal hydroxide, said alkali metal hydroxide produced in the cathode compartment serving to stabilize the alkali metal borohydride-containing borate-depleted catholyte solution;

(4) withdrawing the borate-depleted borohydride-containing catholyte solution from the cathode compartment and passing the wtihdrawn solution to a borohydride separation zone;

(5) separating alkali metal borohydride from the catholyte solution in a separation zone;

(6) withdrawing the borate-depleted, borohydride-depleted, alkali metal hydroxide-enriched catholyte solution from the separation zone and passing the solution to the anode compartment (where it serves as anolyte solution);

(7) said anolyte solution with passage of current therethrough in accordance with step (3) becoming depleted in alkali metal hydroxide;

(8) withdrawing the alkali metal hydroxide-depleted anolyte solution from the anode compartment and passing said withdrawn anolyte solution to a borate ion make-up zone;

(9) adjusting the concentration of the borate ion in the withdrawn anolyte solution in the make-up zone; and

(10) withdrawing the borate ion replenished anolyte solution from the make-up zone and passing it to the cathode compartment (where it serves as catholyte solution).

References Cited

UNITED STATES PATENTS

| | | | |
|---|---|---|---|
| 2,855,353 | 10/1958 | Huff et al. | 204—59 |
| 3,473,899 | 10/1969 | Cooper | 23—361 |
| 3,505,035 | 4/1970 | Hoover et al. | 23—361 |

FREDERICK C. EDMUNDSON, Primary Examiner

U.S. Cl. X.R.

23—361